United States Patent
Chang

(10) Patent No.: US 6,736,278 B2
(45) Date of Patent: May 18, 2004

(54) SUPPORT STRUCTURE OF RACK

(76) Inventor: Tien-Tsai Chang, No. 18, Lane 1281, Chung Cheng Road, Wu Fong Hsiang, Taichung Hsien (TW)

( * ) Notice: Subject to any disclaimer, the term of this patent is extended or adjusted under 35 U.S.C. 154(b) by 0 days.

(21) Appl. No.: 10/151,602

(22) Filed: May 18, 2002

(65) Prior Publication Data

US 2003/0213762 A1 Nov. 20, 2003

(51) Int. Cl.⁷ .................................................. A47F 5/08
(52) U.S. Cl. .............................. 211/90.01; 211/86.01; 248/205.5; 248/251
(58) Field of Search .......................... 211/90.01, 94.02, 211/88.04, 85.12, 16, 87.01; D6/525, 537, 540; 248/235, 250, 309.3, 206.2, 362, 205.5, 251

(56) References Cited

U.S. PATENT DOCUMENTS

| | | | | |
|---|---|---|---|---|
| 577,436 A | * | 2/1897 | Lenz | 248/363 |
| 3,858,725 A | * | 1/1975 | Pietrack et al. | 211/85.7 |
| 3,870,157 A | * | 3/1975 | Hayward | 211/90.01 |
| 3,924,787 A | * | 12/1975 | Gothrup | 224/515 |
| 4,863,545 A | * | 9/1989 | Perfect | 156/294 |
| 5,058,847 A | * | 10/1991 | Arakawa | 248/328 |
| 5,065,973 A | * | 11/1991 | Wang | 248/362 |
| 5,186,427 A | * | 2/1993 | Semchuck | 248/251 |
| 5,193,776 A | * | 3/1993 | Nagai et al. | 188/67 |
| 5,495,884 A | * | 3/1996 | Shikler | 160/120 |
| 5,961,087 A | * | 10/1999 | Lee | 248/362 |
| 6,193,197 B1 | * | 2/2001 | Lian | 248/206.2 |
| 6,234,435 B1 | * | 5/2001 | Yeh | 248/205.5 |
| 6,502,794 B1 | * | 1/2003 | Ting | 248/206.2 |

* cited by examiner

Primary Examiner—Daniel P. Stodola
Assistant Examiner—Khoa Tran
(74) Attorney, Agent, or Firm—W. Wayne Liauh

(57) ABSTRACT

A rack comprises an article-holding piece and a support structure for supporting the article-holding piece on a wall surface. The support structure comprises a suction cup by which the support structure is fastened at the inner end onto the wall surface. The support structure further comprises a support rod, a rotary ring, and a fastening block. The support rod is provided with an axial through hole in which a threaded rod of the suction cup is received. The rotary ring is rotatably engaged with the outer end of the support rod to facilitate the locating of the article-holding piece on the support rod. The fastening block is rotatably engaged with the threaded rod of the suction cup for adjusting the suction force of the suction cup.

1 Claim, 10 Drawing Sheets

SUPPORT STRUCTURE OF RACK

FIELD OF THE INVENTION

The present invention relates generally to a rack, and more particularly to a support structure of the rack.

BACKGROUND OF THE INVENTION

As shown in FIG. 1, a prior art rack comprises two support structures 1 and an article-holding piece 2. The support structures 1 comprise a support rod 3 which is provided with a locating hole 4. The article-holding piece 2 is provided with a through hole 5. The prior art rack is fastened to the wall surface by the two support structures 1 which are fastened onto the wall surface. In the meantime, the article-holding piece 2 is supported by the two support rods 3 such that a fastening bolt 6 is engaged with the locating hole 4 of the support rod 3 via the through hole 5 of the article-holding piece 2. It is time-consuming to assemble the prior art rack in view of the fact that the locating holes 4 of the support rods 3 of the support structures 1 must be aligned with the through holes 4 of the article-holding piece 2.

As shown in FIG. 2, another prior art rack comprises two support structures, each comprising a suction cup 7 which is provided with a threaded rod 8 and a support rod 9. The threaded rod 8 is fitted into the support rod 9 such that the free end of the threaded rod 8 is engaged with a nut 13. The support rod 9 is provided in the outer wall with a receiving slot 10 extending along the longitudinal direction of the support rod 9. An article-holding piece 11 is held between the two support rods 9 such that a receiving portion 12 of each of two opposite ends of the article-holding piece 11 is retained in the receiving slot 10 of the support rod 9. The support structures of this prior art rack are complicated in constructure and are therefore not cost-effective.

SUMMARY OF THE INVENTION

The primary objective of the present invention is to provide a rack which is cost-effective and can be easily assembled.

In keeping with the principle of the present invention, the foregoing objective of the present invention is attained by a rack comprising an article-holding piece and two support structures for supporting the article-holding piece. The support structures comprise a suction cup, a support rod, a rotary ring, and a fastening block.

The support structures are held onto a wall surface by the suction cups, which are provided with a threaded rod. The threaded rod is fitted into the support rod which is provided at the outer end with a stepped portion having outer threads. The rotary ring is provided with inner threads and a locating portion. The rotary ring can be turned in relation to the support rod, so as to align the locating portion with a through hole of the article-holding piece. The fastening block is engaged with the free end of the threaded rod. As the fastening block is tightened, a press disk of the support rod is forced to press against the suction cup, thereby resulting in an increase in the suction force.

The features and the advantages of the present invention will be more readily understood upon a thoughtful deliberation of the following detailed description of the present invention with reference to the accompanying drawings.

DETAILED DESCRIPTION OF THE INVENTION

Figure 1:
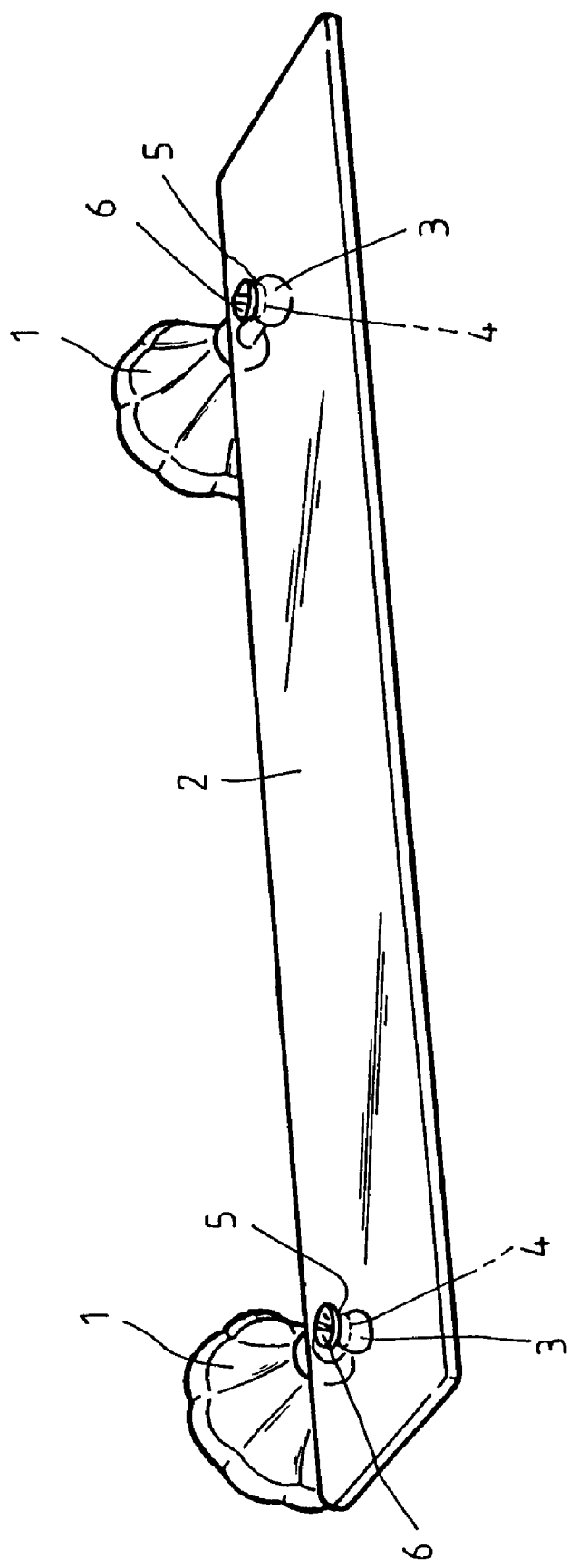
FIG. 1 shows a perspective view of a prior art rack.
Figure 2:
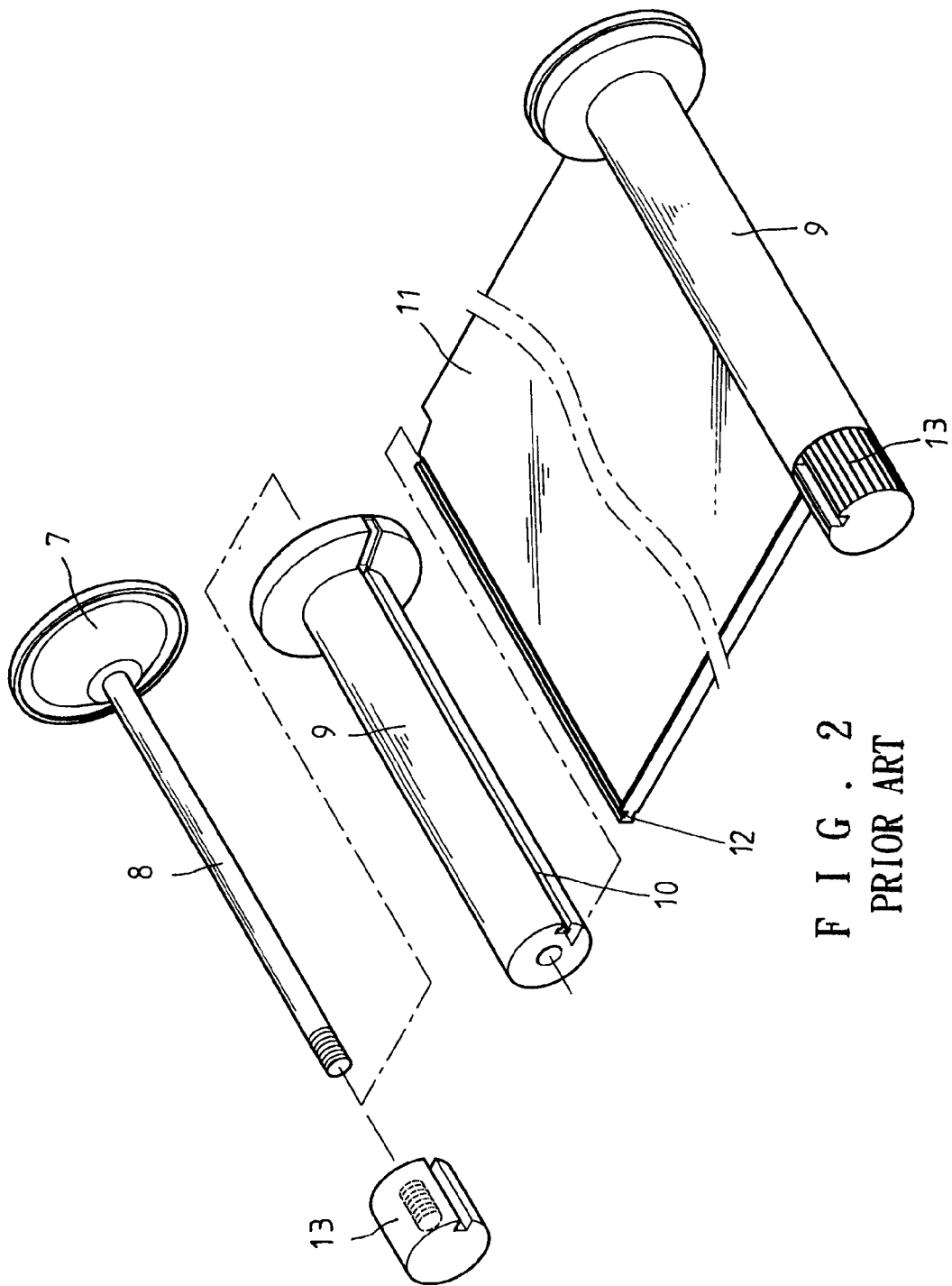
FIG. 2 shows an exploded view of another prior art rack.
Figure 3:
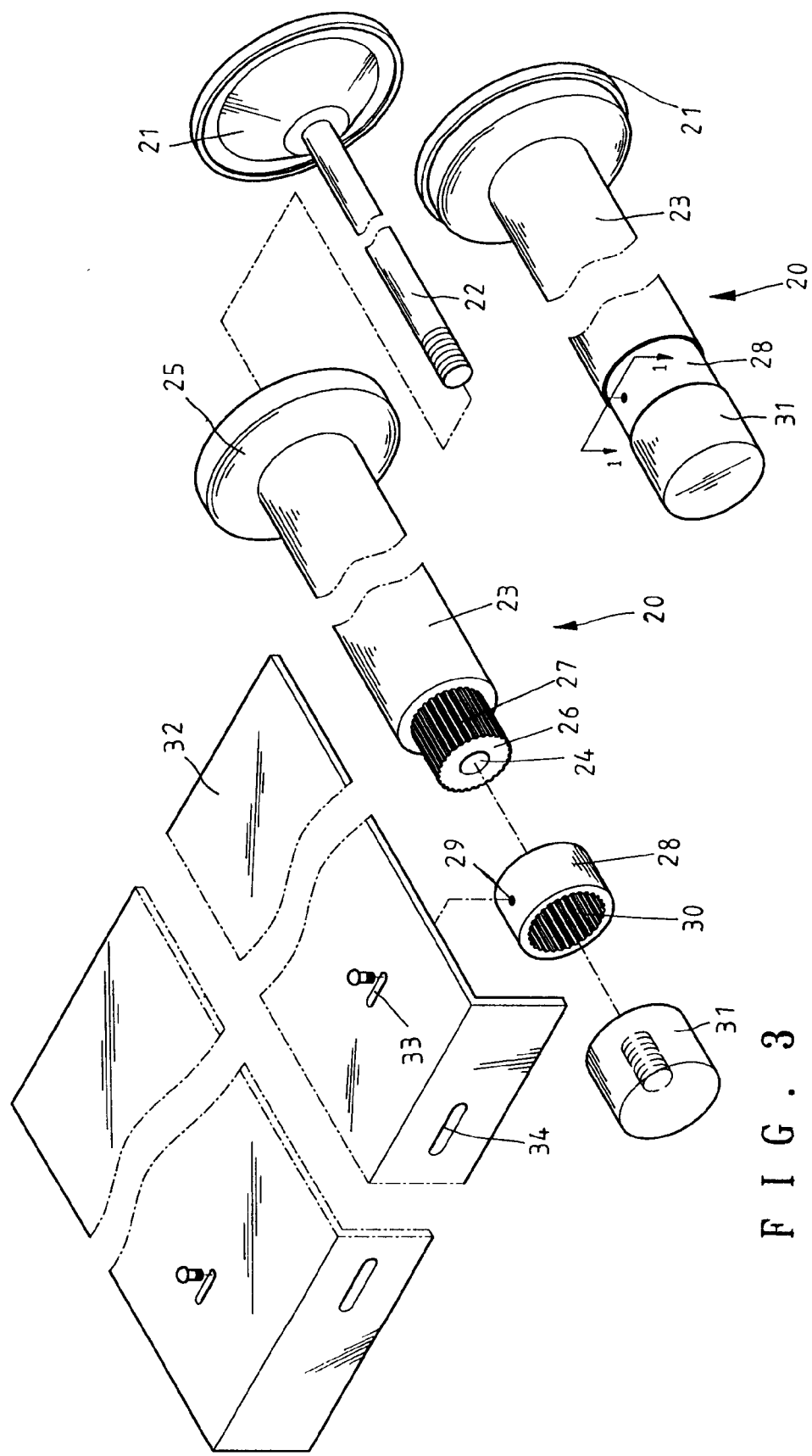
FIG. 3 shows an exploded view of the present invention.
Figure 4:
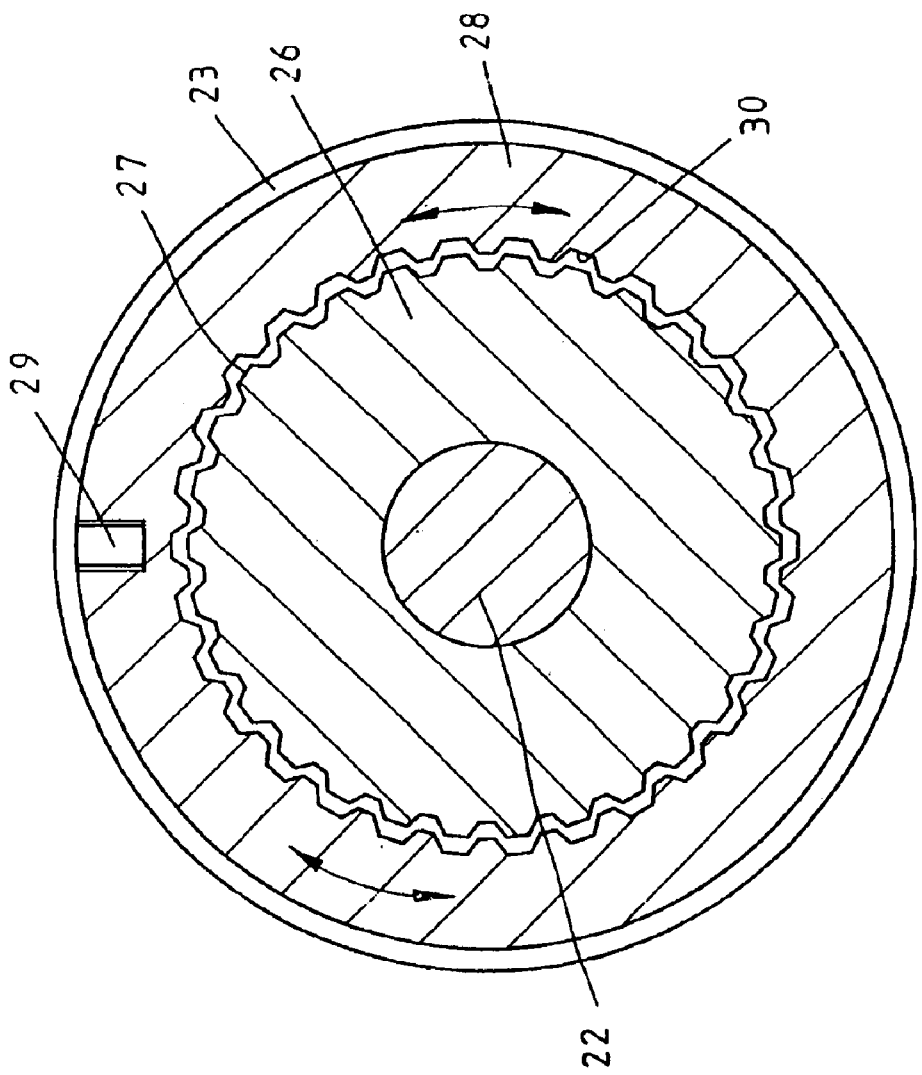
FIG. 4 shows a sectional view of a portion taken along a line I—I as shown in FIG. 3.
Figure 5:
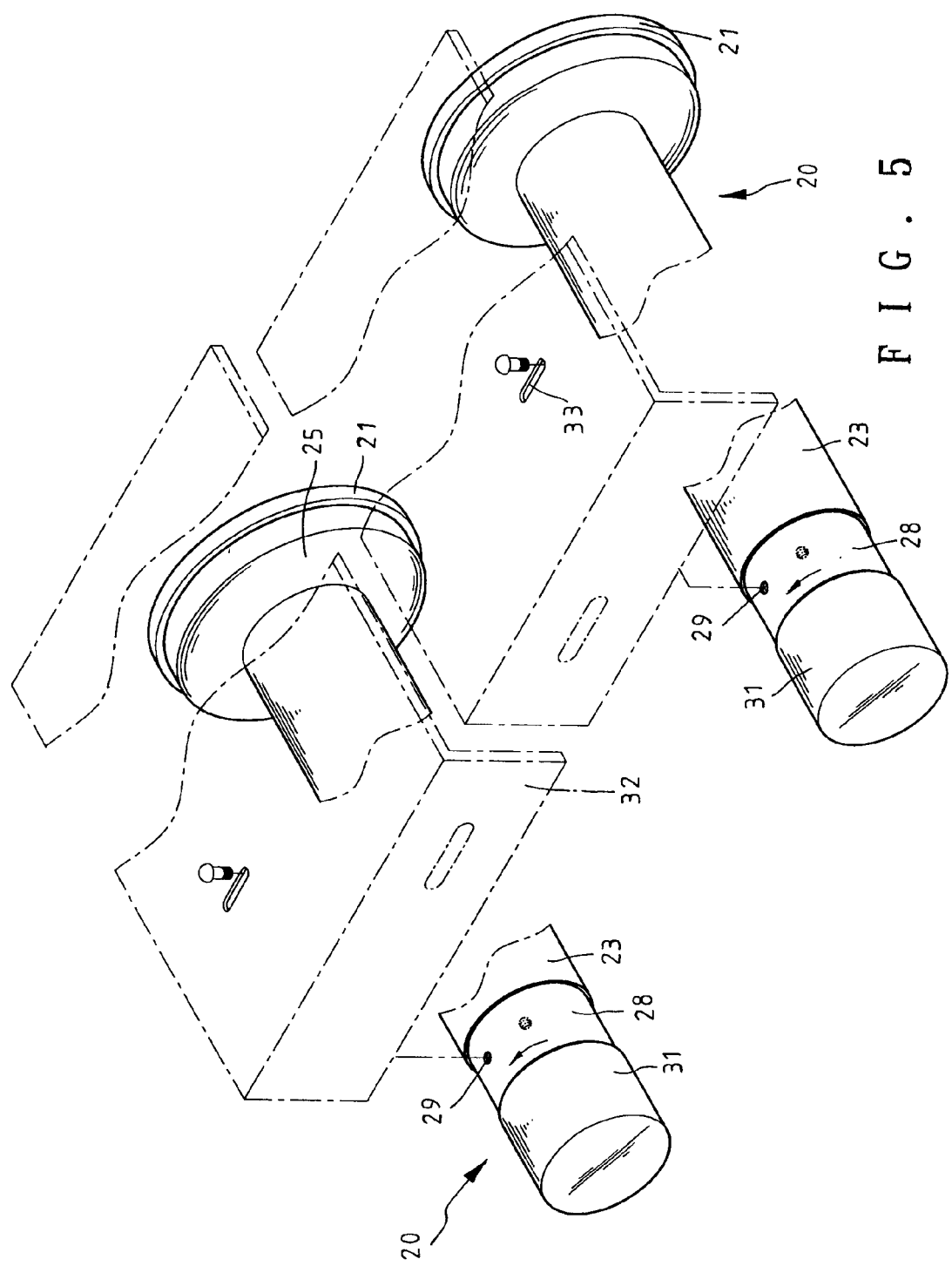
FIG. 5 shows a schematic view of the present invention in combination.

As shown in FIGS. 3–10, a rack of the present invention comprises two support structures 20, and an article-holding piece 32 supported horizontally by the two support structures 20.

The two support structures 20 comprise a suction cup 21, a support rod 23, a rotary ring 28, and a fastening block 31.

The suction cup 21 is provided in the outer side with a threaded rod 22 of a predetermined length and extending therefrom.

The support rod 23 is provided at the inner end with a press disk 25 corresponding in shape and size to the suction cup 21. The support rod 23 is further provided at the outer end with a stepped portion 26 with is in turn provided with outer longitudinal stepped grooves 27. The support rod 23 is provided with an axial through hole 24.

The rotary ring 28 is provided in the inner wall with inner longitudinal stepped grooves 30, and in the side wall with a locating portion 29, which is a threaded hole 29.

In combination, the rotary ring 28 is rotatably fastened with the stepped portion 26 of the support rod 23 such that the inner longitudinal stepped grooves 30 of the rotary ring 28 are meshed with the outer threads 27 of the support rod 23. The threaded rod 22 of the suction cup 21 is received in the axial through hole 24 of the support rod 23 such that the free end of the threaded rod 22 is engaged with the fastening block 31. The support structures 20 are vertically fastened onto a wall surface such that the suction cup 21 is attached to the wall surface by the suction force. The article-holding piece 32 is supported by the support structures 20 and is provided in a horizontal side with two through holes 33 corresponding in location to the locating portions 29 of the rotary rings of the two support structures 20. The rotary rings 28 can be turned so as to align the locating portions 29 of the rotary rings 28 with the through holes 33 of the article-holding piece 32. The article-holding piece 32 is located horizontally on the two support structures 20 by two locating bolts, with are engaged with the locating portions 29 of the rotary rings 28 via the two through holes of the article-holding piece 32.

As the threaded rod 22 of the suction cup 21 is tightened by the fastening block 31, the rotary ring 28 is urged against by the fastening block 31, thereby causing the press disk 25 of the support rod 23 to exert on the suction cup 21. As a result, the suction force of the suction cup 21 is enhanced.

Figure 6:
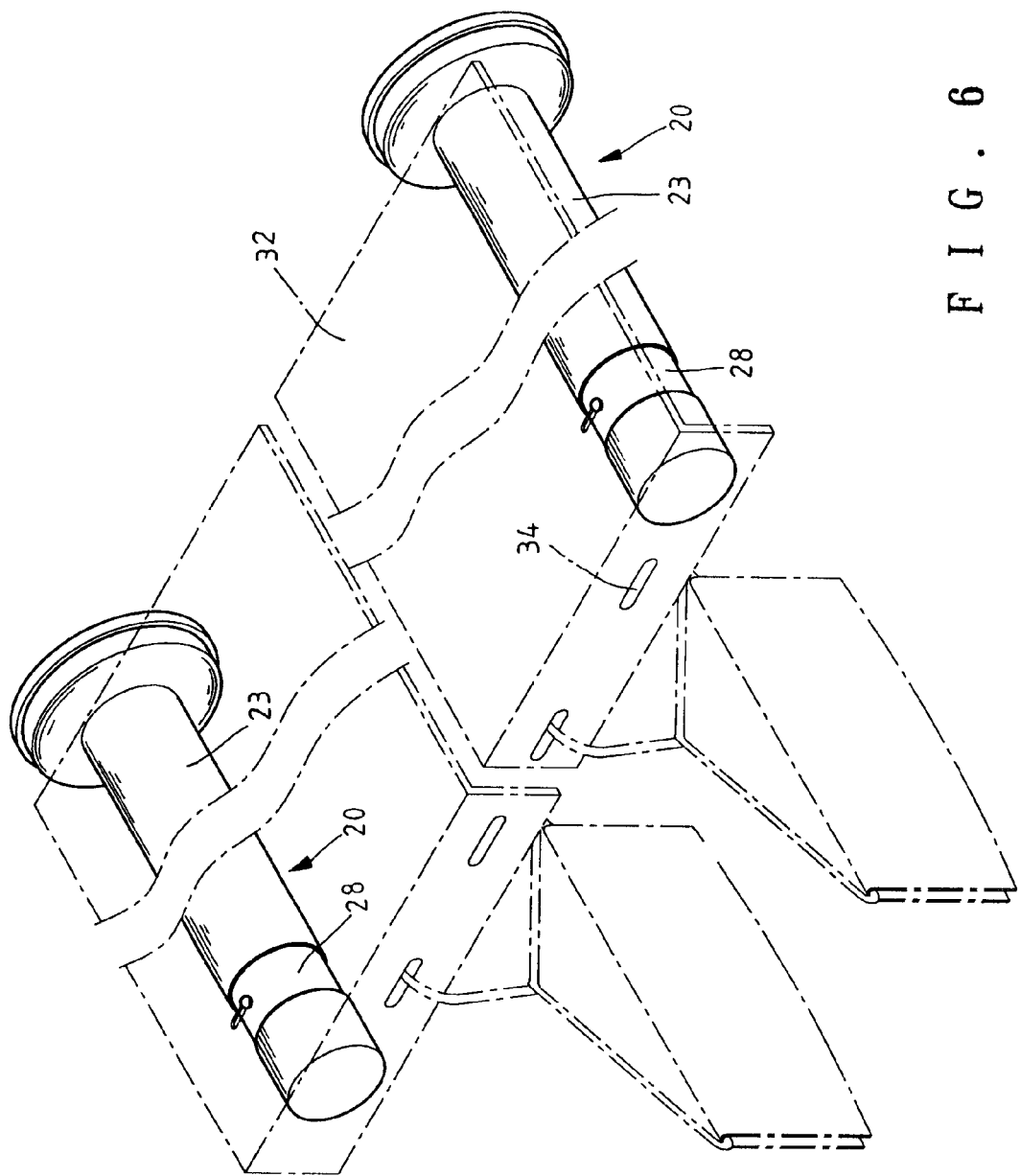
FIG. 6 shows a schematic view of the present invention in use.

As shown in FIG. 6, the vertical side of the article-holding piece 32 is provided with a plurality of retaining holes 34 for catching the swivel hooks of the clothes hangers.

Figure 7:
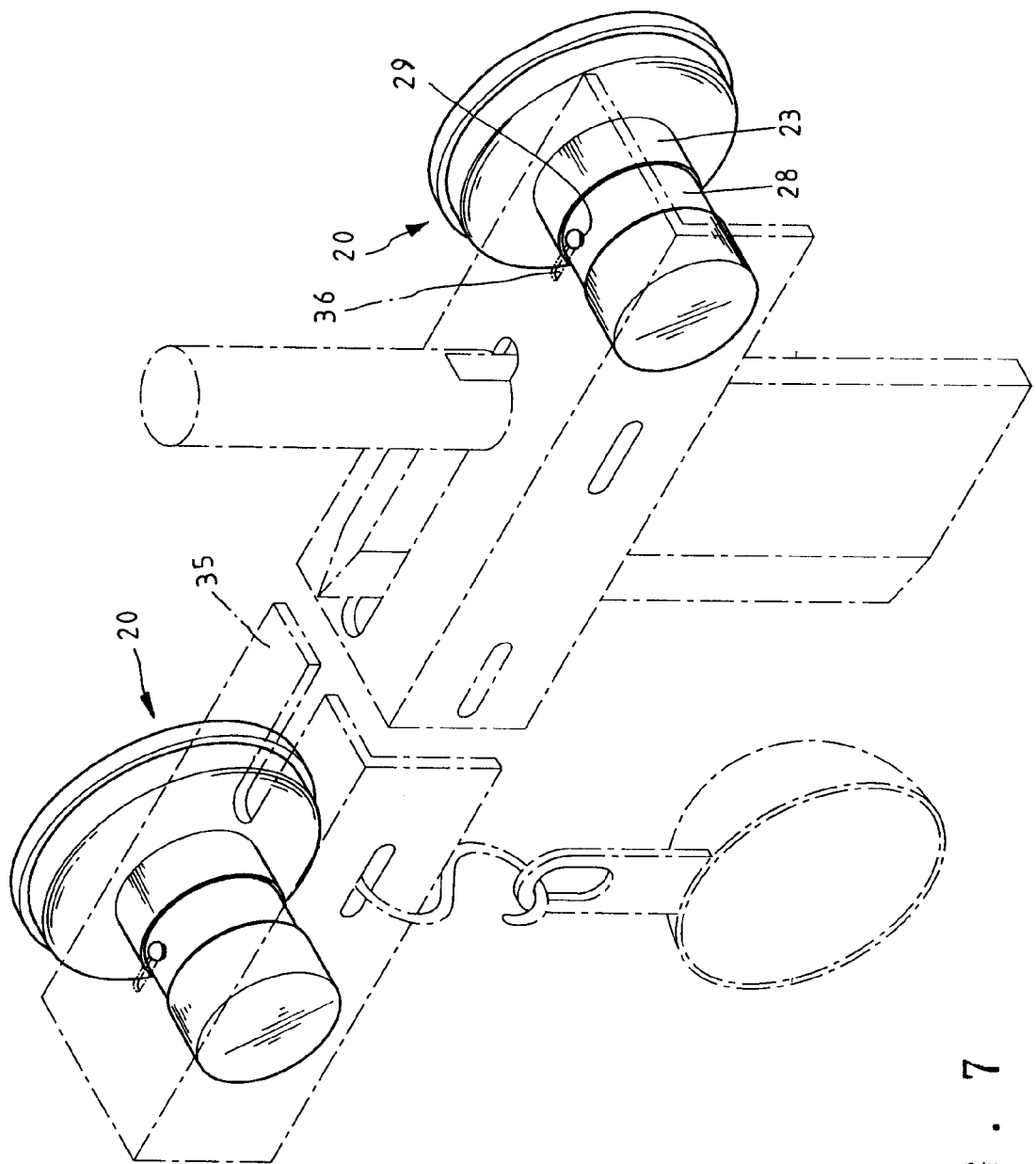
FIG. 7 shows another schematic view of the present invention in use.

As shown in FIG. 7, the support structures 20 of the present invention is versatile in design in that they are used to support a knife-holding piece 35 which is provided with a through hole 36. In combination, the rotary ring 28 is so turned that the locating portion 29 is aligned with the through hole 36 of the knife-holding piece 35. The knife-holding piece 35 can be thus located by the support structures 20 by a fastening bolt which is engaged with the locating portion (threaded hole) 29 of the rotary ring 28 via the through hole 36 of the knife-holding piece 35.

Figure 8:
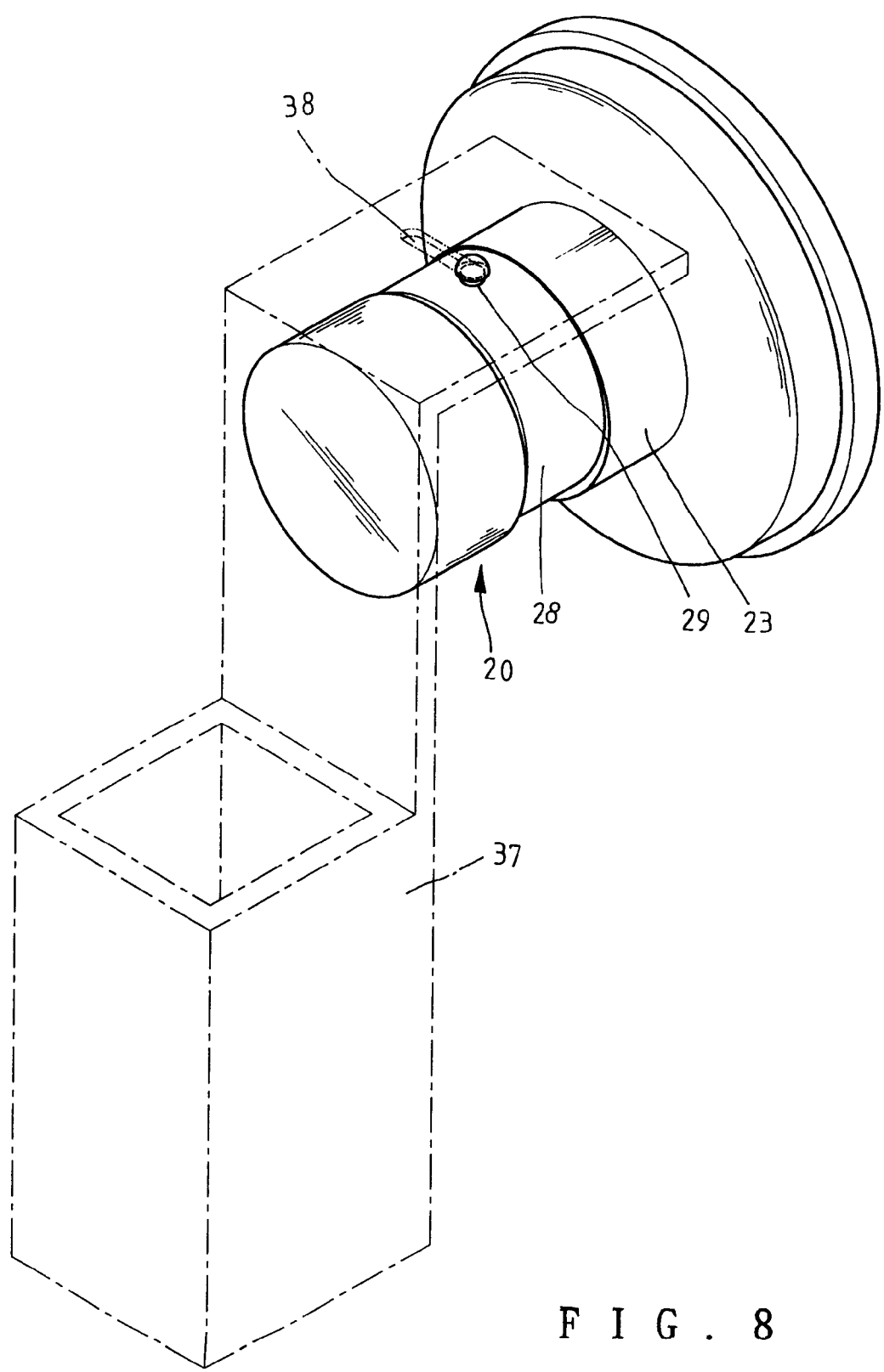
FIG. 8 shows still another schematic view of the present invention in use.
Figure 9:
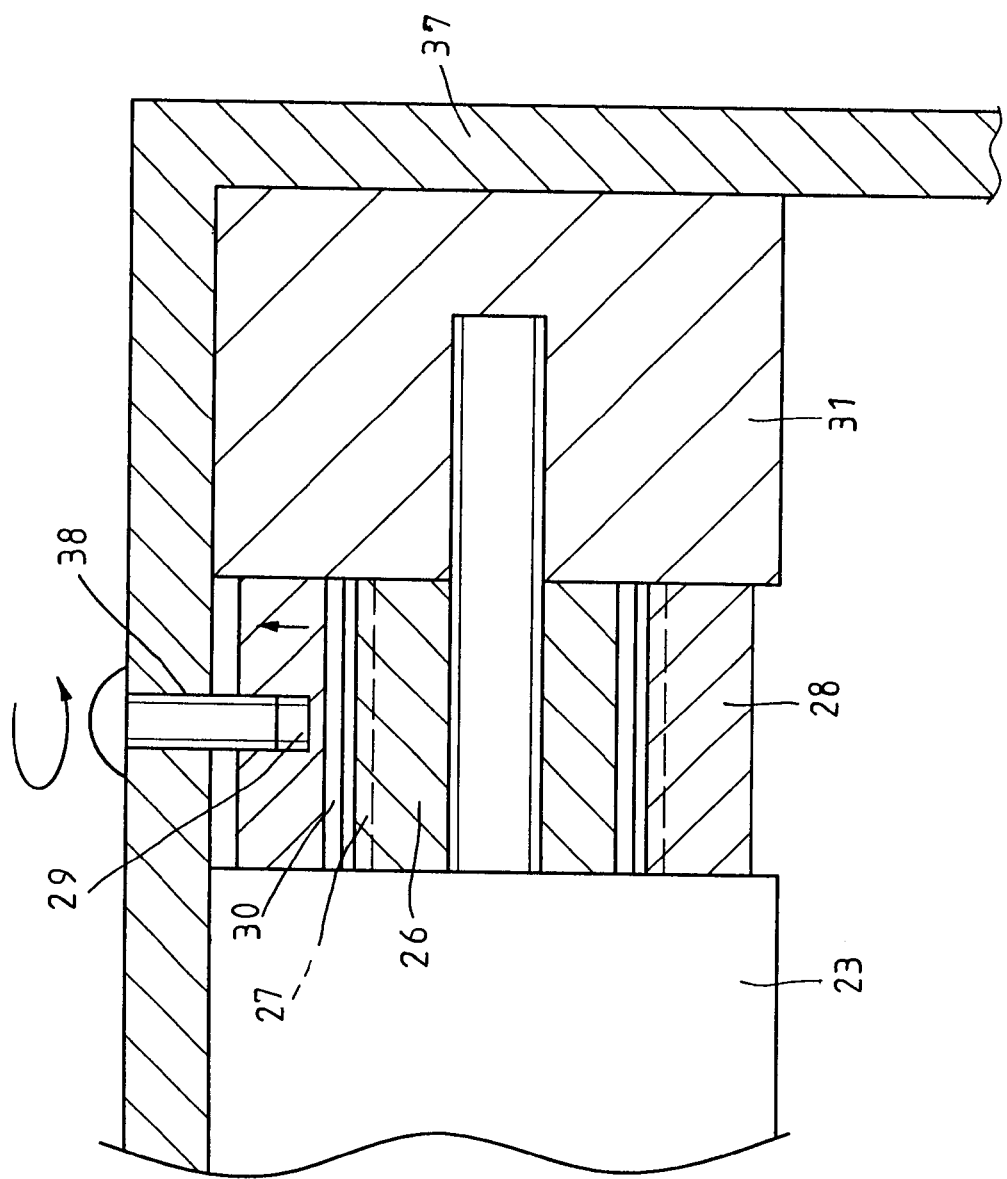
FIG. 9 shows a schematic view of the rotary ring of the present invention in action.
Figure 10:
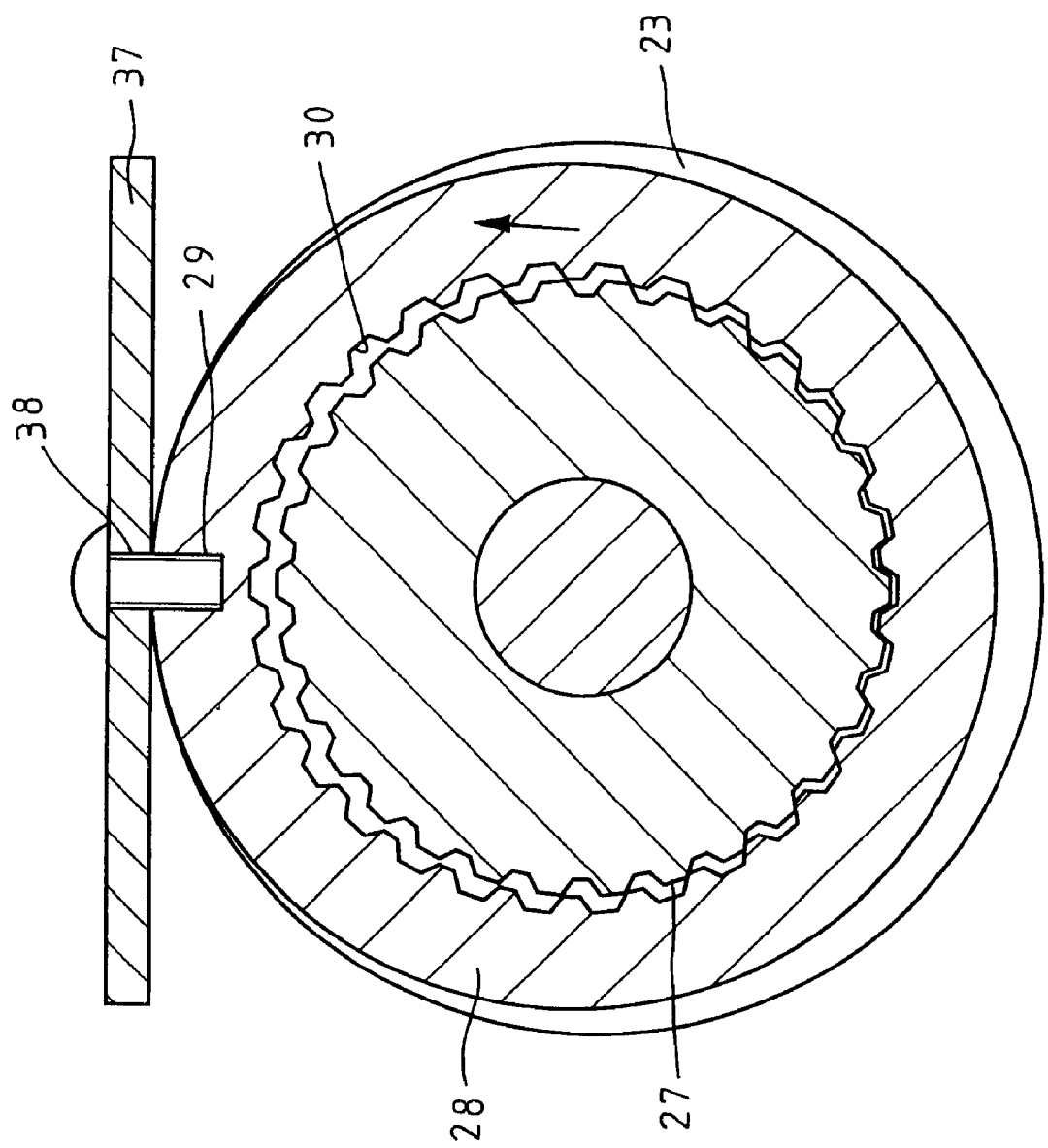
FIG. 10 shows another schematic view of the rotary ring of the present invention in action.

As shown in FIGS. 8–10, a suspension seat 37 is held by the support structure 20 of the present invention such that a through hole 38 of the suspension seat 37 is aligned with the locating portion 29 of the rotary ring 28, and that the suspension seat 37 is located by a locating bolt which is engaged with the locating portion 29 via the through hole 38. In light of the rotary ring 28 being slightly smaller in outer diameter than the support rod 23, there is a head between the suspension seat 37 and the rotary ring 28. As a result, when the head of the locating bolt comes in contact with the surface of the suspension seat 37, the shank of the locating bolt is not yet fully engaged with the threaded hole 29 of the rotary ring 28. As the locating bolt is kept turning, the rotary ring 28 can be lifted such that the inner longitudinal stepped grooves of the rotary ring 28 are meshed with the outer longitudinal stepped grooves 27 of the support rod 27, thereby locating the rotary ring 28 and the suspension seat 37 on the support rod 23.

What is claimed is:

1. A rack comprising:

an article-holding piece provided with at least one through hole and one locating bolt; and at least one support structure fastened at an inner end onto a wall surface for supporting said article-holding piece such that said article-holding piece is located on said support structure by said locating bolt which is fastened onto said support structure via said through hole of said article-holding piece;

wherein said support structure comprises:

a suction cup provided in an outer said side thereof with a threaded rod fastened therewith;

a support rod provided with an axial through hole for receiving said threaded rod of said suction cup, said support rod further provided at an inner end with a press disk in contact with said outer side of said suction cup, and at an outer end with a stepped portion smaller in diameter than said support rod whereby said stepped portion is provided in an outer wall with outer longitudinal stepped grooves;

a rotary ring smaller in outer diameter than said support rod and provided in an inner wall with inner longitudinal stepped grooves, said rotary ring further provided in an outer wall with a threaded hole whereby said rotary ring is rotatively fitted over said stepped portion of said support rod such that said inner longitudinal stepped grooves of said rotary ring are meshed with said outer longitudinal stepped grooves of said stepped portion, and that said rotary ring is turned to align said threaded hole of said rotary ring with said through hole of said article-holding piece; and a fastening block rotatively fastened with a free end of said threaded rod of said suction cup whereby said fastening block is turned to urge against said rotary ring, so as to cause said press disk of said support rod to exert a pressure on said suction cup, thereby resulting in an increase in the suction force of said suction cup.

* * * * *